United States Patent [19]

Wexler

[11] Patent Number: 4,796,401
[45] Date of Patent: Jan. 10, 1989

[54] COMPOSITE FIRE STOP DEVICE

[75] Inventor: Jonathan B. Wexler, Victoria, Australia

[73] Assignee: Fire Research Pty., Limited, Victoria, Australia

[21] Appl. No.: 51,629

[22] PCT Filed: Jul. 28, 1986

[86] PCT No.: PCT/AU86/00213

§ 371 Date: Apr. 3, 1987

§ 102(e) Date: Apr. 3, 1987

[87] PCT Pub. No.: WO87/00761

PCT Pub. Date: Feb. 12, 1987

[30] Foreign Application Priority Data

Aug. 6, 1985 [AU] Australia ............................ 45811/85

[51] Int. Cl.[4] ............................ A62C 3/00; A62C 3/04
[52] U.S. Cl. ............................................ 52/232; 52/1
[58] Field of Search ....................... 52/1, 232, 317, 221

[56] References Cited

U.S. PATENT DOCUMENTS

| 4,109,423 | 8/1978 | Perrain | 52/1 |
| 4,458,460 | 7/1984 | Kohaut | 52/221 |
| 4,538,389 | 9/1985 | Heinen | 52/232 X |
| 4,559,745 | 12/1985 | Wexler | 52/232 X |

FOREIGN PATENT DOCUMENTS

| 1879476 | 4/1978 | Australia. | |
| 3638484 | 3/1985 | Australia. | |
| 3638084 | 7/1985 | Australia. | |
| 149559 | 7/1985 | European Pat. Off. | 52/1 |
| 188653 | 7/1986 | European Pat. Off.. | |
| 2043813 | 10/1980 | United Kingdom. | |

Primary Examiner—J. Karl Bell
Attorney, Agent, or Firm—Wolf, Greenfield & Sacks

[57] ABSTRACT

A fire stop collar assembly comprises a plastics sleeve (2) which fits over a plastics pipe. An annular collar (4) of intumescent material is supported by the external surface of the sleeve (2). A tension spring (8) is held under tension on an end of the sleeve (2), with a sheath of refractory fabric (6) being interposed between the spring (8) and the sleeve (2). Upon softening of the pipe and sleeve (2) in the event of a fire, the spring (8) will act to constrict the sleeve and the pipe within the refractory sheath.

12 Claims, 1 Drawing Sheet

COMPOSITE FIRE STOP DEVICE

The present invention relates to devices for the fire stopping of plastics pipes.

Plastics pipes which pass through fire-resisting walls or floors in a building represent a potential fire hazard. In the event of a fire, the plastics pipe is liable to melt thus creating a void through which hot gases may pass thereby spreading the fire to the space on the other side of the wall or floor. In order to avoid this effect, fire regulations may require that where a pipe passes through a fire-resisting wall or floor, means are provided or blocking a void which may be formed if the pipe should melt.

One previously proposed method of blocking a void which may be formed by a melting pipe involves the use of a mechanical shut-off device comprising a metal closure plate, usually actuated by gravity or a spring bias to displace the pipe as it softens and thereby cover the resulting hole in the wall or floor, the plate being attached to a bracket or other mounting assembly secured to the wall or floor adjacent the pipe. In addition to simply covering the hole, it is necessary that a shut-off device of this type should, after reaching the closed position, provide across the opening a seal of sufficient gas tightness that hot gases under pressure in the fire compartment should have a sufficiently low rate of passage through the now covered opening that temperature rise conditions outside the fire compartment do not exceed test standards, or alternatively, that no collapse due to heat softening of plastics pipework outside the fire compartment can occur.

The sealing tightness of such a device can be improved by application of a variety of chemical materials which intumesce on heating and expand to fill any cracks or gaps which may be left between the metal plate and the area around the hole. Selection of such intumescing materials must be made with care to ensure that they do not obstruct the movement of the plate and prevent a full mechanical closure from taking place. Relevant properties of such chemical intumescing materials are the temperature at which intumescence begins to occur and the stiffness or strength of the foam generated. In practice it is found that intumescent chemicals of the carbon char forming type are suitable, but unfortunately these materials have the characteristic of burning away at the higher temperatures encountered at later stages of the fire. The best of these materials would not exceed 30 minutes of effective sealing performance under fire conditions.

A further problem associated with the use of such purely mechanical shut-off devices is that for long duration fire performance—say in excess of 2 hours—the moving shut-off plate needs to be of heavily insulated construction so as to prevent transmission of unacceptable amounts of heat through the plate itself and thence through the opening which it covers. In practice, mechanical devices required for performance to a 2 or 3 hour rating require to be of bulky construction and are objectionable both from a cost and from a building installation point of view. For this reason there is a preference to use a device known as a fire stop collar which comprises an intumescent packing surrounding the pipe within the floor or wall, rather than on the surface of the floor or wall.

However, with such fire stop collars, the rate at which they can operate to close a softened plastics pipe within a wall or floor is limited by the rate at which heat transmission can reach the packing through the face exposed to the fire. In floor installations, it is found that collars of appropriate design can function adequately for uPVC pipes in nominal diameter sizes from 32 mm up to 100 mm. Above 100 mm in size, the collar does not act to close the pipe quickly enough and needs to be supplemented by the use of a mechanical shut-off device of the type described above which acts to close off the pipe opening at the time when the pipe first softens.

A similar consideration applies to smaller sizes of pipe when connected to floor drains and wastes such as from showers, bathrooms, and urinals.

With a view to minimizing these problems, there has been proposed in our earlier patent application No. 36380/84 a spring choker device comprising a tension spring which is applied around a sheath of refractory material supported on the pipe, the spring being forwardly of a fire stop collar. The spring serves to constrict the pipe when it softens prior to actuation of the fire stop collar, the pipe within the sheath then burning and foaming to form a carbon mass which acts as a plug which blocks the outer end of the sheath to prevent ingress of hot gases. Although this arrangement has been found to operate effectively in fire tests, its installation may be rather time-consuming in practice, as the spring and sheath need to be applied separately from the collar.

According to the present invention, there is provided a fire stop collar assembly comprising a sleeve of heat softenable material adapted to fit over a plastics pipe, an annular collar of intumescent material surrounding the external surface of the sleeve, said collar having an axial end face located inwardly of one axial end of the sleeve whereby said sleeve defines an annular flange between said axial end face and said one end, an annular layer of flexible refractory material around said annular flange, and force-applying means applied around the refractory layer to apply a radially compressive force to the flange, the arrangement being such that upon softening of the annular flange and pipe in the event of a fire, said force-applying means acts to constrict the flange and the pipe which may subsequently burn to form a carbon mass within the annular layer of refractory material.

The assembly consisting of the intumescent collar and force-applying means on a common sleeve defines an integral unit which can be quickly and easily installed.

Embodiments of the invention will now be described, by way of example only, with reference to the accompanying drawings, in which.

Figures 1, 2:
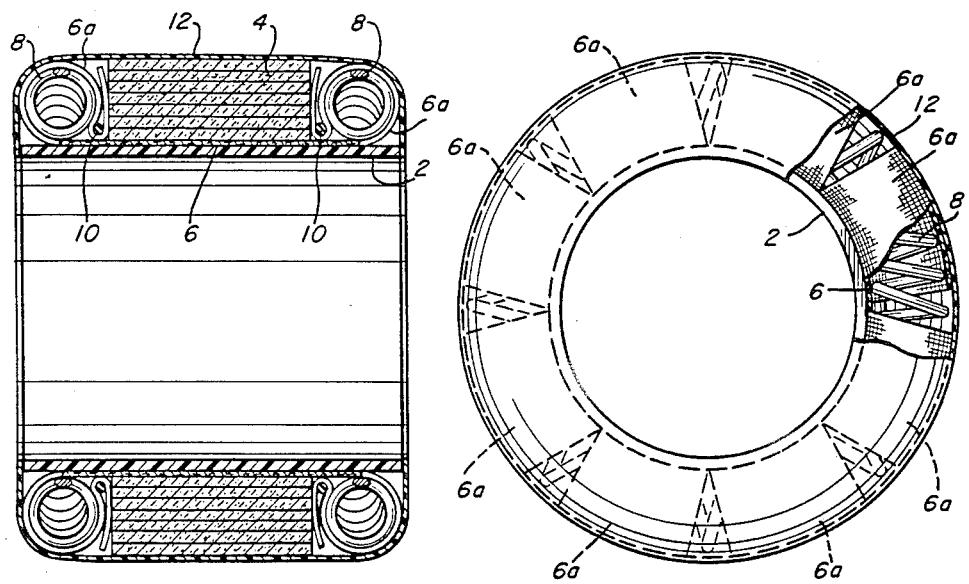
FIG. 1 is an axial section through a first embodiment of a fire stop collar assembly in accordance with the invention.
FIG. 2 is an end elevation of the assembly shown in FIG. 1.

As shown in FIG. 1, a fire stop collar device for application to a plastics pipe passing through a wall, typically a uPVC pipe, comprises a tubular support sleeve 2 of a size to fit over the pipe with a close sliding fit. The support sleeve 2 is likewise composed of a plastics material, so as to be heat softenable, the sleeve typically consisting of uPVC so as to be heat softenable at the same temperature as the pipe itself. The sleeve 2 carries an annular collar 4 of intumescent material, for example formed by a spirally-wound strip of reinforced hydrous alkali metal silicate, such as that manufactured by B.A.S.F. under the trade mark "Palusol". The strip may be coated on one or both surfaces with synthetic resin such as epoxy or polyurethane and the wound collar may be dipped in molten wax to provide a seal for the edges and any surface cracks. The axial ends of the intumescent collar 4 are displaced inwardly of the axial ends of the support sleeve 2, whereby the support sleeve forms annular flanges projecting beyond the ends of the collar 2.

A layer of flexible refractory fabric composed of tightly woven silica, glass or other refractory fibre, optionally coated for improved gas tightness, forms an annular sheath 6 interposed between the collar 4 and the support sleeve 2. The fabric of the sheath 6 projects beyond each end of the collar 2, the overall length of the fabric being greater than that of the support sleeve 2, and at its axial end portions the fabric is split axially to define a series of tongues 6a. A respective tension spring 8 under relatively high tension is supported on each of the two annular flanges of the support sleeve 2, with the fabric sheath 6 being interposed between the springs 8 and the sleeve 2. The fingers 6a at each axial end of the fabric sheath 6 are wrapped rearwardly around a major portion of the circumference of the spring turns, with the free ends of the fingers 6a being anchored by means of a rubber or other resilient band 10 applied under tension around the sleeve 2. The fabric fingers 6a thus act to hold the springs 8 on the sleeve 2.

The entire assembly is shrunk wrap in plastics film 12 which is cut away around the inner bore of the support sleeve 2 to enable the sleeve 2 to be placed on the pipe. The film 12 acts to seal the intumescent collar 4 from attack by carbon dioxide in the atmosphere and also against possible water damage which may occur when the pipe is at floor level in areas susceptible to flooding. In addition to the sealing function, the plastics wrapping 12 also prevents mortar or other foreign matter from lodging in the coils of the springs 8 during installation and which would impede operation of the springs.

Figure 4:
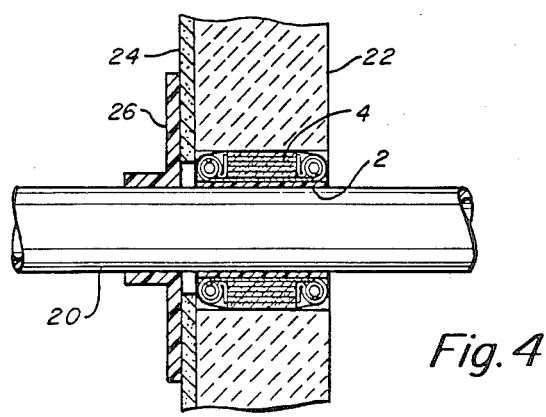
FIG. 4 is a section showing, schematically, a typical installation.

The fire stop collar assembly is designed to be mounted on the pipe by being passed over the open end of the pipe during erection of a building at a stage when most of the piping is left open ended in the vicinity of a wall, such as a shaft wall, prior to fitting off at a later stage. FIG. 4 shows a typical installation on a pipe 20 within a wall 22. Rendering 24 of the wall stops short of the pipe, so that the end edges of the intumescent collar are exposed for activation in the event of a fire. If desired, a plastics flange 26 may be mounted on the pipe 20 in order to conceal the exposed edge of the collar assembly; such a flange will not however, substantially impede heat penetration to the intumescent collar.

In the event of a fire, the pipe 20 softens and the support sleeve 2 also softens. The portion of the pipe 20 and sleeve 2 immediately surrounded by the spring 8 at the side of the collar assembly exposed to the fire is radially contracted under the tension of the spring. The plastics material within the sheath 6 of refractory material tends to burn and foam to form a carbon mass which blocks the outer end of the sheath 6 and the constriction formed by the radially-constructed portion of the pipe 20 and sleeve 2. This mass forms a plug which seals the pipe against ingress of hot gases. It is to be noted that the portion of the sheath around the carbon mass is formed at least partially by the fingers 6a used to retain the spring 8 and which unroll from around the spring upon softening of the pipe 20 and sleeve 2 to extend generally axially along the collapsed pipe.

The plug thus formed, provides a seal for a sufficient time pending activation of the intumescent collar 4 which expands radially inwardly to block the void through the wall. To facilitate intumescence throughout the length of the intumescent collar 4, the turns of the spirally wound intumescent layer are interleaved with metal foil such as aluminium foil to promote heat transfer within the collar. The amount of metal foil is, however, kept to a minimum in order to avoid excessive heat transfer from the fire side of the wall to the other side of the wall.

Figure 3:
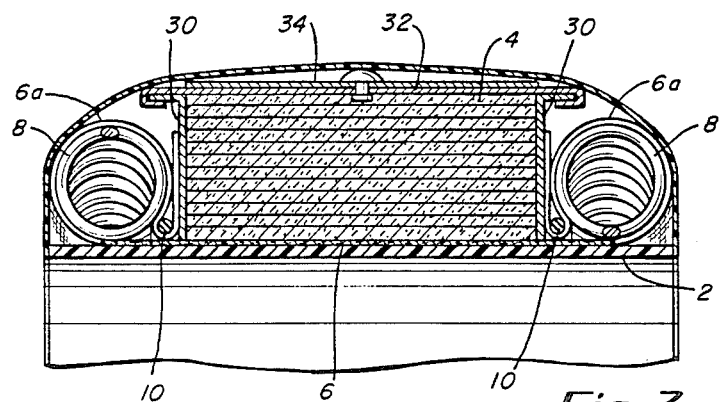
FIG. 3 is a fragmentary axial section of a modified embodiment of the assembly.

When the intumescent material expands, the initial expansion occurs in a wedge shape which tends to thrust the pipe out towards the side of the wall remote from the fire. If the pipe is securely held, the thrust will act to move the collar assembly outwardly from the side of the wall exposed to the fire. To prevent this action, it is necessary to anchor the collar assembly within the wall. Such anchorage may be provided with smaller size devices by so rendering the wall that the render overlaps the end of the assembly without completely covering the end of the assembly (as shown in FIG. 4). In addition, there will be frictional adhesion to the mortar itself. The thrusting action described above becomes increasingly severe as the diameter of the pipe increases. To obviate this effect by stabilizing the turns of intumescent material against a telescoping action, the intumescent collar 4 may be provided with annular metal plates 30 held against its opposed axial faces as shown in FIG. 3. The annular plates 30 are flanged and are held together by axial metal straps 32 distributed around the circumference of the collar 4 and bent around the flanges of the plates 30. In FIG. 3, mortar anchoring sprags 34 are attached to the straps 32. These sprags 34 may be used when setting the assembly into poured concrete or brickwork mortar, the sprags 34 being bent outwards at right angles to the axis of the assembly for anchorage within the concrete mortar. Instead of the sprags 34, the metal plates 30 may be of greater diameter than the collar 4, whereby the device may be anchored by mortar between the two metal plates.

The material from which the springs 8 are formed should be such that the spring should be capable of maintaining requisite inward radial force on the walls of the pipe 20 and sleeve 2 until softening and collapse is complete. This period ranges from about 5 minutes into the fire for the smaller pipe diameters, and up to 10 minutes into the fire for the larger pipe diameters of 100 mm and above. Generally, ordinary low alloy spring steels would not maintain adequate spring temper sufficiently long into the fire to be reliable for service, and conventional stainless steels of the 18/8 type have been found satisfactory on smaller pipe sizes. For larger pipe diameters it may be desirable to employ high alloy, precipitation hardening spring steels capable of high temperature service to at least 600° C.

The refractory fabric used in the assembly must be able to deform under external spring pressure without tearing or cracking under fire conditions at temperatures of up to at least 800° C. The fabric must also maintain an effective resistance to passage of hot gases for a sufficient time in the fire period—for example, 10 to 20 minutes, depending upon the pipe diameter—to allow closure of the pipe opening to be effected by the intumescent collar 4.

The assemblies described provide integral spring choker and fire stop collar assemblies which are easy to install and which act to block the pipe opening prior to activation of the intumescent collar itself.

The embodiments have been described by way of example only, and modifications are possible within the scope of the invention.

I claim:

1. A fire stop composite assembly which is positionable on a plastic pipe as a composite, said assembly comprising:

a rigid sleeve of heat-softenable material adapted to be fit over a plastic pipe;

an annular collar of intumescent material surrounding an external surface of the sleeve, said collar having an axial end face located inwardly of one axial end of the sleeve;

said sleeve defining an annular flange between said axial end face of the collar and said one end of the sleeve;

an annular layer of flexible refractory material around said annular flange;

force-applying means applied around the refractory layer to apply a radially compressive force to the flange, wherein upon softening of the annular flange and pipe in the event of a fire said force-applying means acts to constrict the flange and the pipe which may subsequently burn to form a carbon mass within the annular layer of refractory material, and wherein said assembly is positionable as a composite on the pipe by slidably engaging the sleeve on the pipe.

2. The assembly of claim 1, wherein
the annular collar is located radially inwardly of both axial ends of the sleeve such that an annular flange is defined at each end of the sleeve, and a force-applying means and annular layer of flexible refractory material are provided around each flange.

3. The assembly of claim 2, wherein
the annular layer of flexible refractory material extends between the opposed ends of the sleeve such that the collar and each of the force-applying means surrounds the layer.

4. The assembly of claim 1, wherein
the force-applying means comprises a tension spring applied under the tension to the flange.

5. The assembly of claim 4, wherein
the spring is retained on the sleeve by split end portions of the flexible refractory material which are wrapped around the spring and anchored to the sleeve.

6. The assembly of claim 1, wherein
the refractory material comprises a refractory fabric.

7. The assembly of claim 1, wherein
the sleeve comprises a rigid plastic.

8. The assembly of claim 1, wherein
the collar is a strip of intumescent material spirally wound, with metal foil interposed between the turns.

9. The assembly of claim 1, further comprising
a shrink-wrapped plastic material disposed around the sleeve, collar and force-applying means.

10. The assembly of claim 2, further comprising
a pair of annular reinforcing flanges adjacent each axial end of the collar; and
means connecting the reinforcing flanges.

11. The assembly of claim 10, wherein
the reinforcing flanges comprise metal flanges and the connecting means comprise metal straps extending axially between the metal flanges.

12. The assembly of claim 11, wherein
the straps carry sprags for anchoring the assembly within a wall.

* * * * *